United States Patent Office 3,301,172  
Patented Jan. 31, 1967

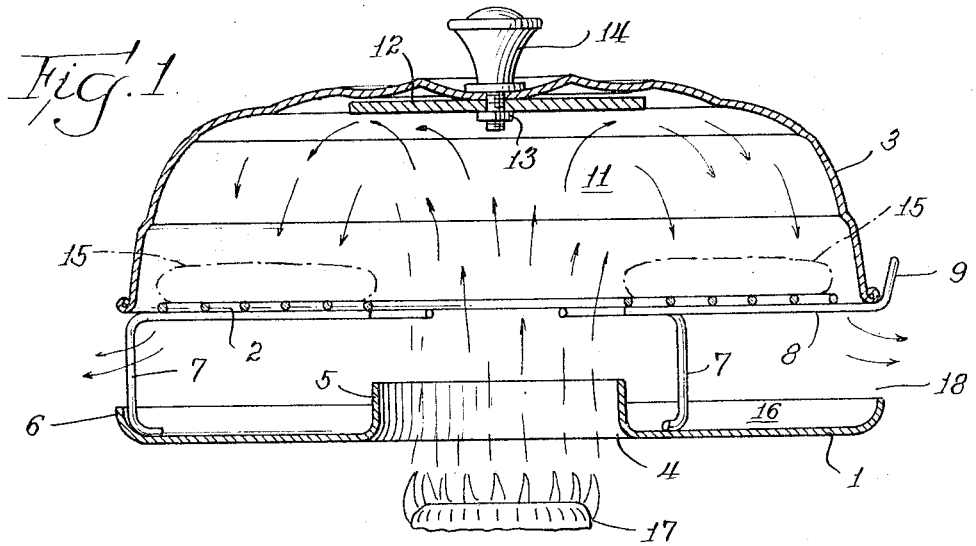
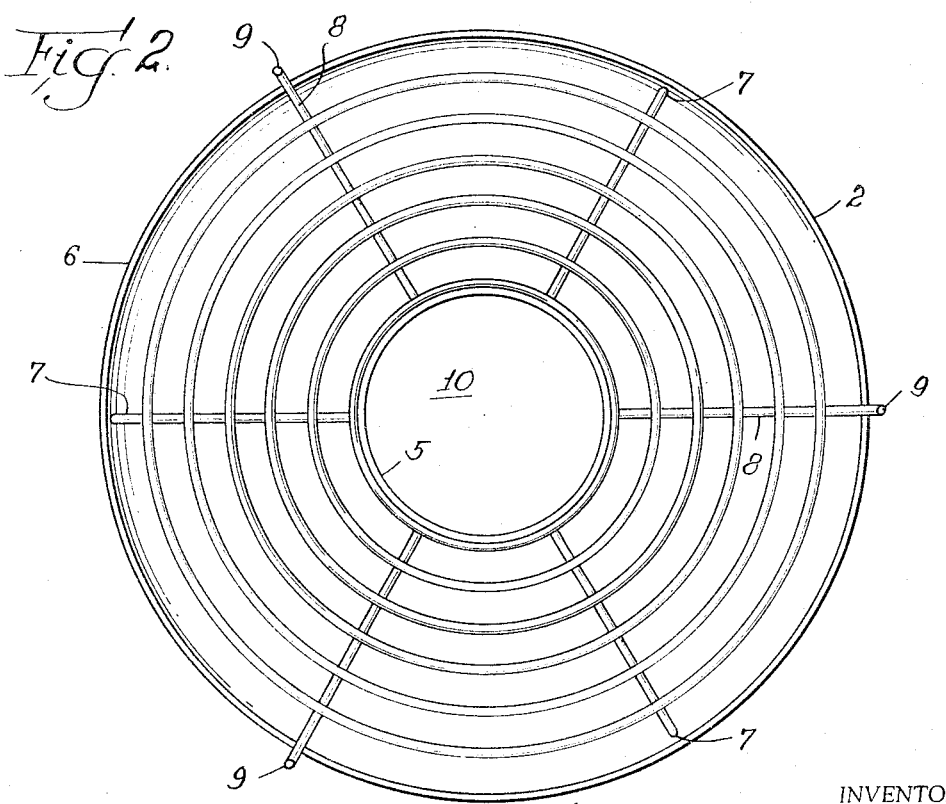

3,301,172  
COOKING GRILL  
Francisco Antonio Haro, Chicago, Ill.; Geronimo J. Longo, executor of said Francisco Antonio Haro, deceased  
Filed Oct. 9, 1964, Ser. No. 402,904  
8 Claims. (Cl. 99—446)

This invention relates to grill type apparatus for cooking foods and more particularly to a grill in which food is cooked by the heat of hot convection gases.

The principal object of the invention is to provide a cooking appliance for use with a gas burner or the like which cooks food rapidly and evenly with substantially no smoke and surprisingly little odor. A further object is to provide a cooking grill which may be used either indoors or outdoors for cooking a wide variety of foods efficiently while maintaining a high moisture content so that the cooked food is juicy and delicious.

A preferred form of the cooking grill is illustrated in the accompanying drawing, wherein—

FIG. 1 is a cross-sectional view taken in a vertical, axial plane of the cooking grill, and FIG. 2 is a plan view of the grill with the cover removed.

The grill apparatus is exceedingly simple. It consists essentially of three principal parts, a base 1, a wire grid 2 supported upon and spaced above the base, and a cover 3 supported upon the grid. The base has a central opening 4 defined by an upstanding circular flange 5. It also has a peripheral flange 6 which, with flange 5, provides a receptacle for liquid drippings from food on the grid. The grid 2 is fabricated from spaced wires and includes three legs 7 arranged to stand upon the base 1 at the peripheral flange 6. The grid also has three radially extending wires 8 with upturned ends 9 intended to support the cover 3. Preferably, grid 2 is provided with a central opening 10 of approximately the same size as opening 4 in the base, for the unimpeded passage of hot gases upwardly through the grid as hereinafter more fully described.

The cover, like the base, of the cooking grill may be made of a suitable metal, such as aluminum. It is deeply domed to provide a space 11 between it and the grid 2. A relatively heavy plate 12 of iron, having a diameter somewhat greater than that of openings 4 and 10 in the base and grid, respectively, is arranged inside of the cover at the axis of the grill. Conveniently, plate 12 is fastened to the cover by means of nut 13 which also fastens handle 14 to the cover. The diameter of cover 3 is approximately the same as the diameter of base 1 and rests upon the grid at the upturned ends 9 of radial wires 8.

The cooking grill may be used for cooking meat and vegetables and for baking bread, potatoes and other foods. The raw food is placed upon the grid as indicated at 15, above the receptacle portion 16 of base 1. The apparatus is placed over a suitable burner, such as the burner 17, illustrated by way of example, of a gas stove. The hot gases from the burner rise and enter the grill through opening 4. At least the major part of the convection current passes upwardly through opening 10 in grid 2, impinges upon plate 12 and mushrooms outwardly in all directions, being confined by cover 3, and passes over the food before escaping through the gap 18 between the edge of flange 6 of the base and the periphery of cover 3. A small part of the hot gases may spread radially from the main stream and pass along under the grid and food from opening 4 to the escape gap 18. The food, being heated in this manner, cooks and, in doing so, may release fats or juices which drip down into the receptacle 16. These drippings may be used for basting, if desired, although normally the food cooked in this grill retains a satisfactory proportion of its moisture so that the product is moist and palatable. The drippings may be used for making gravy, for example, or may be discarded. The important consideration is that no part of the fat dripping from meat is burned. Thus, smoke, odor and other possible undesirable products of such combustion are avoided.

It has been found that the presence of plate 12 tends to hasten and stabilize the cooking process.

The height of flange 5 is not critical. If desired, to avoid the effect of ambient cross air currents, this flange may approach grid 2, but should not extend above it. To allow for the desired even circulation of hot gases through the cooking grill, the vertical dimension of gap 18 should be not less than about one-half of the distance between the bottom portion of base 1 and grid 2.

Because the rising current of gases at the axis of the grill spreads to flow radially throughout the 360 degrees of the circular device and then passes downwardly over the food, all of the food is cooked evenly and with desirable control. It will be understood that sources of heat other than the gas burner shown for purposes of illustration may be used. It is essential only that a current of sufficiently hot gases be supplied.

The cooking zone being confined to a relatively small volume and the heat being readily controllable, the temperature of the food can be brought to cooking level rapidly without causing burning in any degree so that cooking can be accomplished rapidly with little loss of moisture.

Invention is claimed as follows:

1. A cooking grill comprising a circular base having a central opening, said base having upstanding flanges at its periphery and at said opening to define a receptacle, a grid spaced above and substantially coextensive with and resting upon said base, and a domed cover over said grid with the edge of the cover resting upon the grid at its periphery, the edge of said cover being spaced from the edge of the base peripheral flange to leave a gap for the escape of gases throughout the circumference of the grill.

2. A grill in accordance with claim 1 and including a circular iron plate arranged interiorly adjacent the cover coaxially with the grill, said plate having a diameter greater than that of the central opening in the base of the grill.

3. A grill in accordance with claim 2 wherein the grid is provided with a central opening substantially coextensive with the central opening of the base of the grill.

4. A grill in accordance with claim 1 wherein the grid is provided with a central opening substantially coextensive with the central opening of the base of the grill.

5. A grill in accordance with claim 1 wherein the grid includes three equidistantly angularly spaced radial wires having their outer end portions turned down to form legs supporting the grid above the base of the grill at the peripheral flange thereof.

6. A grill in accordance with claim 1 wherein the grid includes three equidistantly angularly spaced radial wires having their outer end portions turned up to form stops for supporting the cover of the grill and preventing sidewise movement thereof.

7. A cooking grill comprising a circular base having a central opening, said base having upstanding flanges at its periphery and at said central opening to define a receptacle, a wire grid substantially coextensive with said receptacle and spaced thereabove, said grid including six equidistantly angularly spaced radial wires, alternate ones of said wires having their outer end portions turned down to form legs engaging said base to support said grill, the remaining three said wires having their outer end portions turned up to form cover-retaining stops, a circular domed cover resting upon said grid at said stops to define a space which is symmetrical about the axis of the grill, the edge of said cover being spaced from the edge of the base peripheral flange to leave a gap for the escape of gases throughout the circumference of the grill.

8. A grill in accordance with claim 7 and including a circular iron plate arranged interiorly adjacent the cover coaxially with the grill, said plate having a diameter greater than that of the central opening in the base of the grill.

References Cited by the Examiner

UNITED STATES PATENTS

| | | |
|---|---|---|
| 1,512,482 | 10/1924 | Patterson. |
| 1,862,420 | 6/1932 | O'Brien _____ 99—447 X |
| 3,088,393 | 5/1963 | Huckabee _____ 99—259 |

FOREIGN PATENTS 537,638   11/1931   Germany.

BILLY J. WILHITE, *Primary Examiner.*

WALTER A. SCHEEL, *Assistant Examiner.*